Figure 4:
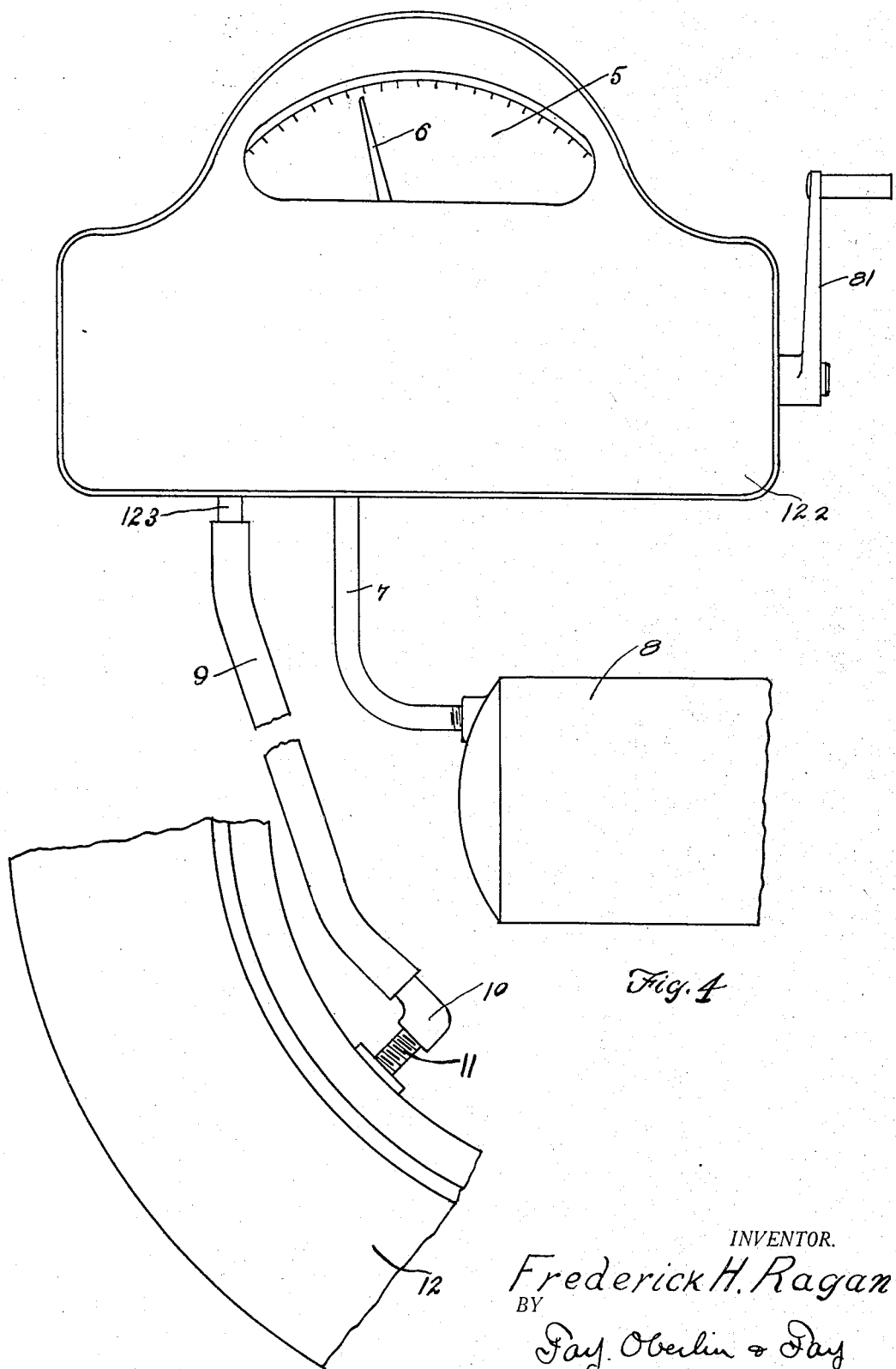

May 26, 1936.  F. H. RAGAN  2,042,190
AIR METERING DEVICE
Original Filed April 4, 1928  4 Sheets-Sheet 1
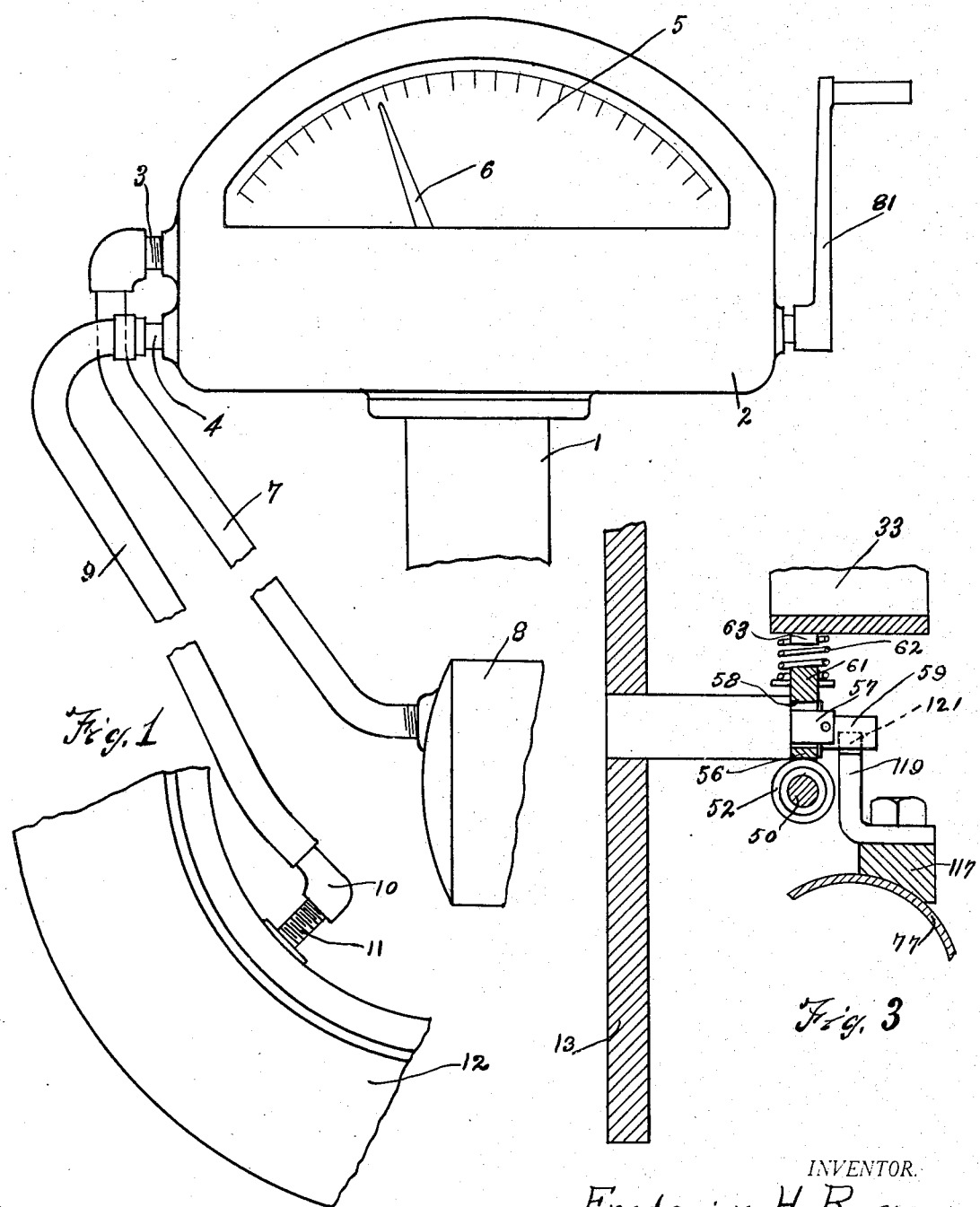
INVENTOR.
Frederick H. Ragan
BY
Fay, Oberlin & Fay
ATTORNEYS

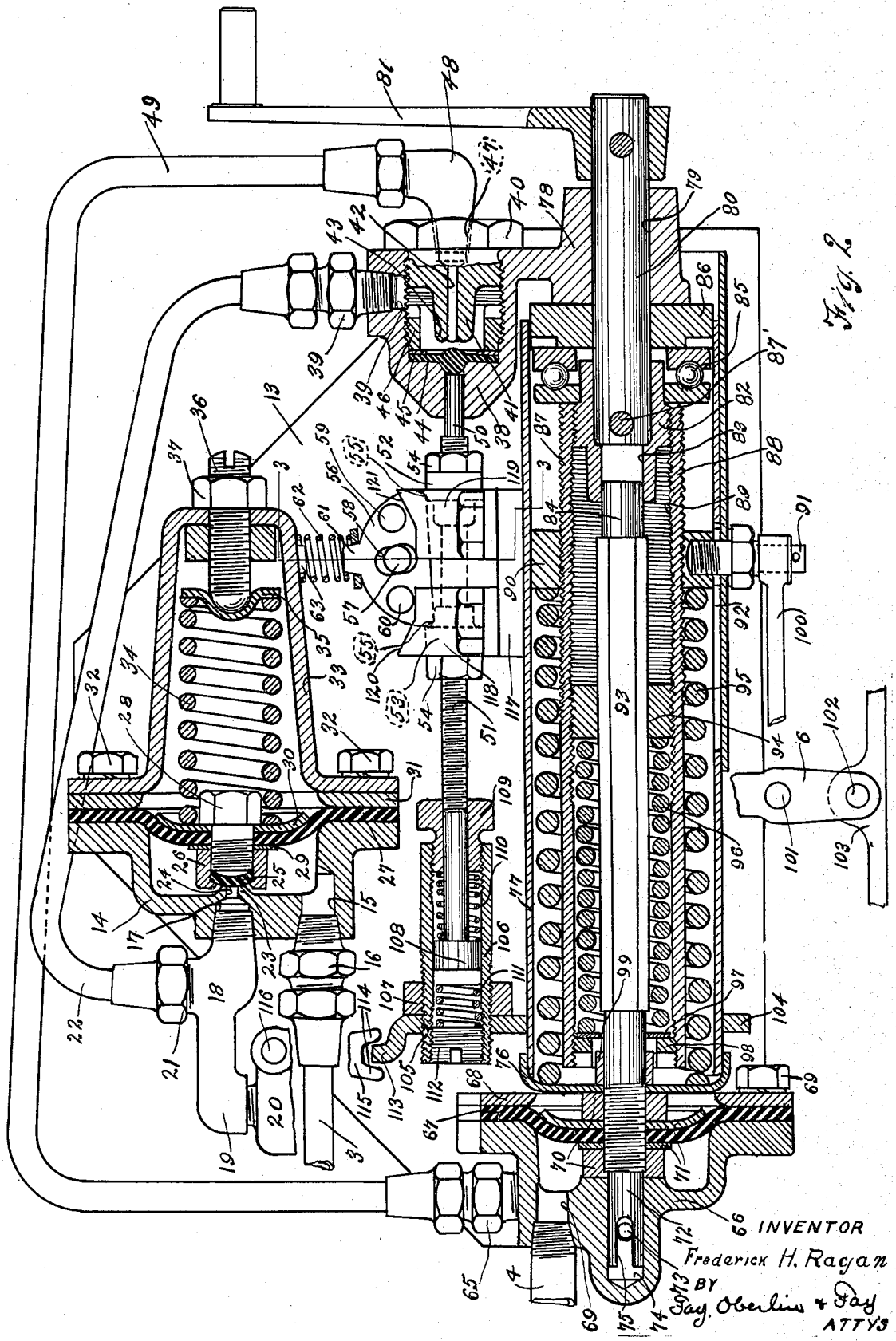

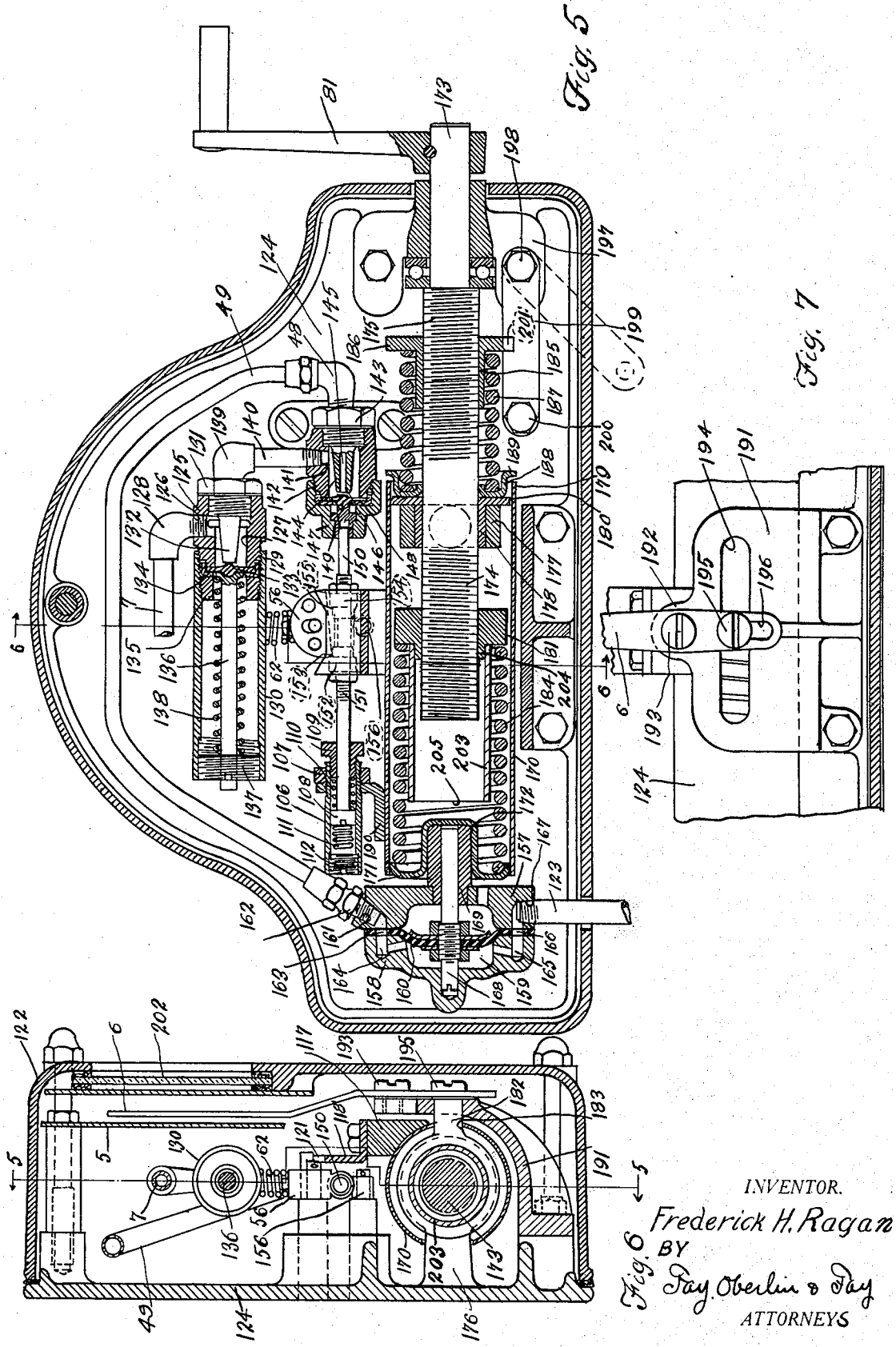

Patented May 26, 1936

2,042,190

UNITED STATES PATENT OFFICE 2,042,190

AIR-METERING DEVICE

Frederick H. Ragan, Shaker Heights, Ohio, assignor to W. R. Barnhart, Jr., Cleveland, Ohio Application April 4, 1928, Serial No. 267,248
Renewed October 22, 1935

17 Claims. (Cl. 221—73.5)

The present invention relates, as indicated, to air metering devices and more particularly to that class of metering devices used for inflating pneumatic tires and similar containers in which predetermined pressures of varying amounts are required. An object of this invention is to provide an air metering device which will enable an inexperienced operator to adjust it to secure any pressure desired. Another object is to provide a means of inflating pneumatic tires at a rate much greater than that hitherto ordinarily attained. A further object is to provide a device positive in its action and not easily affected by the accidental introduction of small particles of foreign matter, condensation of water vapor or other substances harmful to the operation of the ordinary device of this general nature. Another object is to provide an air metering device which is of compact form, capable of being completely enclosed and lubricated. A still further object is to provide an air metering device which is inexpensive to manufacture, easy to assemble and install and of very moderate cost to maintain. An additional object is to provide a device of this character with a safety feature which will prevent the possibility of the device being put into operation when unsuitable air pressures are available, thus avoiding the resulting possibility of over inflation of tires. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a general view showing the external appearances of the device together with a diagrammatic representation of its connections to supplying and receiving reservoirs; Fig. 2 is a longitudinal sectional view taken upon a plane substantially parallel to the plane of Fig. 1; Fig. 3 is a partial transverse sectional view of the device taken substantially on the line 3—3 of Fig. 2; Fig. 4 is a view similar to Fig. 1 and showing a slight modification in the external appearance of the machine; Fig. 5 is a view similar to Fig. 2 of a modified form of metering device, said figure being taken substantially along the line 5—5 of Fig. 6; Fig. 6 is a transverse sectional view taken substantially upon the line 6—6 of Fig. 5; and Fig. 7 is a view of a detail.

Referring more particularly to the modification disclosed in Figs. 1 to 3, the reference numeral 1 indicates a post or other similar standard upon which is mounted a housing 2 provided with an inlet pipe 3 and an outlet pipe 4 and enclosing a dial 5 with which cooperates a finder 6. A pipe 7 connects the inlet pipe 3 with a pressure tank 8 or with a pump (not shown), and a flexible tube 9 is connected to the outlet pipe 4 and carries at its free end the usual type service valve 10 which cooperates with the filler valve 11 of the tire 12. The back plate 13 of the casing provides a mounting for all of the operating parts of the device.

In the upper portion of the casing, there is mounted a valve casing 14 provided with a bore 15 for the reception of a connecting member 16 through which the inlet pipe 3 is placed in communication with the interior of the casing 14. Said casing 14 is further provided with a bore 17 for the accommodation of a fitting 18 which is formed with one branch 19 to which is connected a signal whistle 20, and with another branch 21 to which is connected one end of a tube 22, the function of which will be later described.

Within the valve casing 14, a raised annular valve seat 23 surrounds a port 24 providing communication between the casing and the fitting 18. This port 24 is adapted to be closed by a valve comprising a valve head 25 of resilient material carried within a nut 26 which is clamped to one face of a flexible diaphragm 27 by means of a screw 28 and washers 29 and 30 on opposite sides of said diaphragm. The diaphragm is held in place closing the open end of the valve casing 14 by means of an annular ring 31 secured to said casing by screws 32 or other equivalent fastening means. The screws 32 further secure to the valve casing 14 a bracket 33 housing a heavy compression spring 34, one end of which abuts against the washer 30, while the other end thereof abuts against a follower 35 which is adjustable through the agency of a screw 36 threaded into the free end of the bracket and locked in adjusted position by a lock nut 37.

A second open-ended valve casing 38 is mounted to the right of and below the valve casing 14 as viewed in Fig. 2 and is provided with an upwardly directed bore 39 for the accommodation of a connection member 39', through which the other end of the tube 22 is placed in communication with the chamber formed in the valve casing 38. The open end of the casing 38 is closed by a plug 40 provided with an inwardly projecting extension 41 which is formed with a bore 42 and is provided on its inner end with an annular valve seat 43 surrounding said bore 42 for engagement by a flexible valve 44. Said valve 44 is retained in position at its periphery by means of an annular washer 45 and a sleeve nut 46 screwed into the valve chamber. The bore 42 of the plug 40 is enlarged and internally threaded at its outer end as at 47 for the accommodation of a connecting elbow 48 through which a pipe 49 is connected with said bore 42.

A stem 50 is slidably mounted in a suitable aperture in the casing 38 in engagement with the valve 44 and projects outwardly from the casing 38. Said stem 50 is threaded as at 51 intermediate its ends for the adjustable mounting of a pair of abutment members 52 and 53, and each of said members is backed up by a lock nut 54. Each of said members 52 and 53 is provided with a shoulder 55, and said members are disposed with such shoulders facing each other. A latch member 56 adapted to cooperate with said abutment members is mounted, through the medium of an elongated slot 58 in said latch member, upon a pin 57 mounted in the back plate 13 and projecting forwardly therefrom. See Figs. 2 and 3. Projecting pins 59 and 60 are formed on the forward face of said latch member on opposite sides of said slot 58, and a tongue 61 projects upwardly from the periphery of said member 56. Said tongue 61 enters one end of a light compression spring 62, the opposite end of which is centered about a lug 63 formed on the bracket 33.

The other end of the pipe 49 is connected through a connecting member 65 with an open-ended expansion reservoir 66 mounted below and to the left of the valve casing 14 as viewed in Fig. 2. The open end of the chamber 66 is closed by a flexible diaphragm 67 secured thereto by an annular ring 68 attached to the reservoir 66 by screws 69 or other similar fastening means. Through the medium of nuts 70 and washers 71 on opposite sides of the diaphragm, a rod 72 is secured thereto in such a manner that flexure of the diaphragm will reciprocate said rod. Rotation of the rod 72 is prevented by a pin 73 traversing a socket 74 into which the end of the rod 72 extends, and extending through a kerf 75 formed in said rod end. The closure cap 76 of a tubular casing 77 is likewise secured to said rod whereby said casing 77 will be reciprocated when the diaphragm 67 is flexed. An extension 78 of the valve casing 38 provides a journal 79 for a rotatably mounted shaft 80 which carries at its outer end a crank handle 81. Said shaft 80 extends into the open free end of the tubular casing 77 and carries therein a screw 82 formed in its inner end with a cylindrical socket 83 for the reception of the reduced cylindrical free end 84 of the rod 72. A ball bearing unit 85 is secured between a shoulder on said screw 82 and a disc-like member 86, and said member 86 forms a guide and support for the free open end of the casing 77.

A tube 87 is received upon said screw 82, and a pin 87' extends through the shaft 80, screw 82, and tube 87 to insure rotation of said screw 82 and tube 87 upon rotation of the handle 81. The tube 87 is formed, throughout a portion of its length, with an external left hand thread 88 and an internal right hand thread 89. An internally threaded collar 90 is adapted to cooperate with the external thread 88, and a pin 91 is threaded into a socket provided in the periphery of said collar 90 and extends outwardly of the casing 77 through a slot 92 provided in said casing, whereby rotation of said collar 90 is prevented. A portion of the rod 72 is polygonal in cross-section, as at 93, and a collar 94 having an aperture of similar cross-section is slidably mounted on said portion and cooperates with the internal threads 89 of said tube 87. It will be readily apparent that the polygonal portion 93 of the rod 72 will prevent rotation of the collar 94. A heavy compression spring 95 is mounted within the casing 77 surrounding the tube 87 and abuts at its one end against the closure cap 76 and at its other end against the collar 90. A slightly lighter compression spring 96 is mounted within the tube 87 surrounding the rod 72, and abuts at its one end against a washer 97 adjustably backed by a sleeve nut 98, and at its other end against the collar 94. A collar 99 is mounted on the rod 72 in engagement with the closure cap 76, and is adapted to engage the washer 97.

A link 100 is swiveled on the pin 91 and is pivotally connected at 101, to the finder 6, said finder being pivoted at 102 to a lug or boss 103 formed on the bottom of the housing 2.

The casing 77 has integrally formed thereon or rigidly attached thereto, a plate 104 which is provided at a point slightly above said casing 77 with a screw-threaded aperture 105 for the reception of one end of a cylinder 106, said cylinder being adjustable therein, and a lock nut 107 is provided to lock the cylinder in adjusted position. The free end of the valve stem 50 is provided with a piston head 108 which is received in the cylinder 106, said stem extending slidably through a plug 109 closing the adjacent end of the cylinder 106. A light compression spring 110 is mounted between said plug 109 and the inner face of the head 108. A slightly heavier compression spring 111 is mounted between the outer face of said piston head 108 and a plug 112 closing the other end of the cylinder 106. This spring is normally slightly shorter than the distance between said face and said plug.

The plate 104 is provided with an upwardly projecting finger 113 extending between the bifurcations 114 of a lever 115 carried by a shaft 116 adapted to operate the whistle 20.

The casing 77 further carries a block 117 which may be formed integrally therewith or which may be attached rigidly thereto, and said block carries a pair of upwardly projecting cam members 118 and 119 provided with oppositely disposed cam faces 120 and 121, respectively, for cooperation with the pins 60 and 59, respectively.

The operation of the above described device is as follows:

Air under pressure in the tank 8 flows through the pipe 7 and inlet 3 into the valve casing 14, overcoming the force of the spring 34 and flexing the diaphragm 27 to move the valve 25 away from its seat 23. Air may then flow through the port 24, fitting 18, tube 22, and bore 39 into the valve casing 38. Presuming the valve 44 to be off its seat, as shown in Fig. 2, the air will then flow through bore 42, fitting 48, tube 49, and connection 65 into the expansion chamber 66 where it will act upon the diaphragm 67 to flex said diaphragm against the force of the spring 95 and move the casing 77 to the right as viewed in Fig. 2. The initial movement of said casing 77 compresses the spring 95 and moves the spring 111 into engagement with the piston head 108, at the same time bringing the forward edge of the cam face 120 just into engagement with the pin 60, and simultaneously bringing the forward end of the collar 99 into engagement with the washer 97. Further movement of said casing begins to compress, also, the springs 96 and 111, and causes the pin 60 to ride up along the cam face 120. This movement of the pin 60, of course, carries the point of the latch member 56 which is in engagement with the shoulder 55 of the abutment member 53 slowly upwardly and, as the springs 95, 96, and 111 are still more compressed, the latch member 56 will finally release the abutment member 53. The compressed spring 111 will then expand and force the valve stem 50 to the right as viewed in Fig. 2 to move the valve 44 into engagement with its seat 43, thus closing the bore 42 and preventing further flow of air to the chamber 66. During the movement of the latch member 56 caused by engagement of the cam face 120 with the pin 60, the stem 50 is held against movement, and consequently the opposite end of the latch member cannot fall. As a result, the latch member is turned about the point of engagement of the right hand end of said member with the abutment member 52, such movement being permitted by the elongation of the slot 58. Such movement, however, is in opposition to the force of the spring 62, and as soon as the valve stem 50 has been moved by the spring 111, the spring 62 snaps the right hand end of said latch member 56 down into engagement with the shoulder 55 of the abutment member 52. The above operations put the device into condition for use.

If, now, a motorist approaches the device for the purpose of inflating his tires to the desired pressure, he will rotate the handle 81 to move the finder 6 to such a position that it will indicate the desired pressure on the dial 5. Rotation of the handle 81 in a clockwise direction as viewed from the right of Fig. 2 will move the collar 90 toward the left in said figure, simultaneously moving the collar 94 toward the right. Movement of the collar 90 toward the left swings the finder 6 in a counter-clockwise direction and the handle 81 is rotated in one direction or the other until the finder reaches the desired index on the dial 5. The customer then applies the service valve 10 to his tire valve 11, thus releasing the pressure imprisoned in the reservoir 66.

It will be apparent that the valve 10 and the valve 11 are, as usual, provided with small passages, and said passages are smaller than the bore 69 or the bore through which the connection 65 communicates with the interior of the chamber 66. Consequently, the air exhausts from the chamber 66 quite slowly, thus releasing the pressure on the left hand face of the diaphragm 67 until a predetermined value, dependent upon the combined force of the springs 95 and 96, is reached. When the pressure in the chamber 66 assumes this predetermined value, the springs 95 and 96 will move the casing 77 toward the left until the washer 97 strikes the collar 98, thus taking the pressure of the spring 96 off the collar 99. Such movement of the casing 77 brings the cam face 121 just into contact with the pin 59, and slightly compresses the spring 110. Any further movement of the casing 77 toward the left must be effected by the force of the spring 95 alone, and consequently the actual release of the latch 56 to permit opening of the valve 44 is dependent upon the setting of the collar 98 by the handle 81.

Thus, when the pressure in the chamber 66 reaches the value determined by the setting of the nut 90, the spring 95 forces the diaphragm 67 into the position shown in Fig. 2. The casing 77 is correspondingly moved in the same direction, thus further compressing the spring 110 and causing the pin 59 of the latch member 56 to ride upwardly along the cam face 121 of the cam member 119 to release the engagement of the latch 56 with the abutment member 52. As soon as the abutment member 52 is released, the force of the spring 110 in combination with the effect of the pressure in the valve casing 38 on the valve 44 moves the valve stem 50 to the left, thus removing the valve 44 from its seat 43 and allowing the latch member to drop into engagement with the abutment member 53. The movement of the casing 77 also causes the finger 113 to swing the lever 115 to sound the whistle 20.

As will be obvious, the opening of the valve 44 will cause the pressure in the chamber 66 to be built up once more, because of the restriction of valves 10 and 11 and such pressure will move the casing 77 again to the right to close said valve 44, after which exhaustion of the pressure in the reservoir 66 will allow the casing 77 to be moved back to the left to open the valve 44, and this alternate opening and closing of the valve 44 will continue until such time as the pressure in the tire 12 or similar container has been raised to such a value that it will prevent exhaustion of the pressure in the chamber 66 to a value low enough to allow the casing 77 to move to the end of its stroke toward the left, under the influence of the spring 95 alone. It will further be obvious that the whistle 20 will continue to sound intermittently at each reciprocation of the casing 77 and will be silenced only when the desired pressure has been attained in the tire.

It will be apparent that, when the spring 95 is set for relatively low pressures, very little air would be admitted to the tire upon each individual opening of the valve 44, and that, in the absence of some special provision, the speed of inflation would be very low. It is in order to overcome this objection, that the spring 96 is provided. As is clearly shown in Fig. 2, the force of spring 96 is increased as the force of spring 95 is decreased. Furthermore, it will be quite clear that the spring 96 plays no part in resisting the initial movement of the casing 77 to the right as viewed in Fig. 2 because of the clearance between the washer 97 and the collar 99, but the spring 96 comes into play to resist that portion of the movement of the casing 77 which actually causes the latch 56 to release the stem 50 to permit the same to close the valve 44. Conversely, while both springs 95 and 96 cooperate to effect initial movement of the casing 77 toward the left, it is the spring 95 alone which causes that portion of such movement which actually moves the latch 56 to release the stem 50 to permit the opening of the valve 44. Thus opening movement of the valve 44 is controlled entirely by the spring 95 while the closing movement thereof is dependent upon the combined pressures of the springs 95, 96, and 111. Thus the pressure in the chamber 66 required to close the valve 44 remains a constant for any given machine, though it may be made to vary by any desired amount depending upon the relative load ratings of the springs 95 and 96, and the relative leads of the integral and external threads 89 and 88, respectively, on the tube 87.

It will be readily appreciated that a situation might arise in which the pressure in the reservoir 8 would be too low to overcome the effect of the springs 95 and 96, and yet would be too high to be communicated to a tire. Thus, in the absence of some provision, it might happen that a user would overinflate his tire because of the failure of the device properly to operate. To prevent such contingency, I have provided the safety valve 25. This valve is urged toward its seat by the spring 34, the force of which may be varied by adjusting the screw 36. In use, the screw 36 is set in such position that the valve 25 will remain closed if the pressure in the reservoir 8 is not high enough to overcome the combined force of the springs 95 and 96. Thus a predetermined minimum pressure must be exceeded in the reservoir before the valve 44 will open to permit the communication of pressure to the valve casing 38 and the remainder of the mechanism.

Referring now to the modification disclosed in Figs. 4 to 7, it will be seen that a pressure reservoir 8 is connected by means of an inlet pipe 7 to the air metering device enclosed in a casing 122. A delivery pipe 123 extends outwardly from said casing, and the flexible tube 9 is connected to said delivery pipe and carries at its free end the usual valve 10 for cooperation with the filler valve 11 of a tire 12, or the like. Said casing encloses a dial 5 and a finder 6.

According to the present modification, the casing 122 includes a back plate 124 upon which is mounted a safety valve casing 125 provided with a bore 126 leading into the chamber 127 of said casing, said bore 126 being adapted to accommodate an elbow connection 128 to which is connected the inlet pipe 7.

The casing 125 is open at its ends and is externally threaded at one end as at 129 for the reception of a cylindrical housing 130. Said casing is internally threaded at its opposite end for the reception of a plug 131 provided with a bored extension 132 projecting into said casing. A valve 133 comprising a leather, or other flexible disk, is clamped between an annular ring 134 and the adjacent end of said casing 125 by means of a sleeve nut 135 screwed into the housing 130. A stem 136 engages said valve 133 and extends longitudinally of the housing 130, said stem projecting at its outer end through a suitable bore in an adjusting nut 137 screwed into the outer end of the casing 130. A coiled spring 138 surrounds said stem 136 and has its one end bearing against a flange on the stem 136 while its opposite end bears against the adjusting nut 137. As will be obvious, the compression of the spring 138 may be varied by adjustment of the nut 137.

The plug 131 is suitably formed to receive one arm of an elbow 139 to which is connected one end of a short pipe 140, the opposite end of which is accommodated by a bore 141 providing communication with the internal chamber of a second valve casing 142. The casing 142 is internally threaded at one end to receive a plug 143. Said plug is formed with an extension 144 which is bored as at 145, and the extension is formed at its outer end to provide a valve seat 146. The opposite end of the casing 142 is externally threaded for the reception of a cap 147 which, when screwed up tightly presses an annular ring 148 tightly against the rim portion of a valve member 149. Said valve member comprises a disk of leather, or other flexible material, adapted to seat upon said valve seat 146, and is provided with a stem 150 extending outwardly through said cap 147. The plug 143 is formed to accommodate one branch of an elbow 48 to the other branch of which is connected a pipe 49.

The stem 150 is threaded as at 151 in a region intermediate its ends for the reception of adjustable stop members 152 and 154, said member 152 being provided with a shoulder 153, and said member 154 being formed with a shoulder 155. The latch 56 and the spring 62 are identical with the correspondingly numbered elements in the previously described modification. A roller 156 is mounted to underlie the stem 150 in the region of said stops to support the stem and prevent its sagging to move the stop members 152 and 154 out of engagement with the latch 56.

The expansion chamber of the present modification comprises cooperating members 157 and 158 secured together to form a chamber 159, said members clamping between them a diaphragm 160. In the modification disclosed in Figs. 1 to 3, it is necessary to disconnect the pipes 4 and 49 from the casing 66 in case the diaphragm 67 must be replaced. These diaphragms do not stand up for very long under use, and consequently it is necessary to change them with some frequency. According to the present modification, the member 157 is provided with a port 161 which accommodates the connecting member 162 for connecting the pipe 49 to said port. A passage is formed from said connecting member 162 to said chamber 159 by said port 161, an aperture 163 in the diaphragm 160, and a passage 164 in the member 158. Similarly, communication is established between said chamber 159 and the delivery pipe 123 through a passage 165 in the member 158, an aperture 166 in the diaphragm 160, and a port 167 in the member 157, said port being adapted to accommodate the threaded end of said pipe 123. With this arrangement, it will be seen that the member 158 may be disconnected from the member 157, thus exposing the diaphragm 160 for removal and replacement, all without the necessity of disconnecting the pipes 49 and 123. A short stem or rod 168 is suitably connected to said diaphragm for movement therewith, and extends through a bore in a lug 169 secured to the member 157.

A tubular casing 170 is closed at one end by a member 171 formed to provide a socket 172 for the reception of said lug 169. A shaft 173 provided with left hand threads 174 at its inner end and with right hand threads 175 adjacent its outer end is journalled in the housing 122 and in the cylindrical portion 177 of a bracket 176 secured to the back plate 124. A bushing 178 provides such journal. The outer end 179 of the cylindrical casing 170 is open, and snugly but slidably receives a flange 180 on said bushing 178, said flange providing a bearing for said end 179 of the casing 170.

An internally threaded collar 181 is received upon said shaft 173 in cooperation with the threads 174 and is provided with a laterally extending projection 182 which passes through a slot 183 in the wall of the casing 170 and through a slot 194 in a bracket 191, later to be described. A coiled spring 184 abuts at its one end against the closure 171 of said casing and at its opposite end against a flange formed on the collar 181. A second collar 185 provided with a flange 186 is internally threaded to cooperate with the threads 175 of said shaft 173, and a second coiled spring 187 surrounds said shaft 173 with its one end bearing against said flange 186 and its opposite end bearing against a seat member 188 slidably mounted upon said shaft 173 and backed by said bushing 178. Said seat member 188 is formed with a peripheral flange 189 which, in the position of the parts illustrated in Fig. 5, is slightly spaced from the end 179 of the casing 170. The casing 170 carries adjacent one end, a bracket 190 which may be formed integrally therewith, or which may be rigidly attached thereto, and said bracket has secured therein a cylinder 106 for cooperation with a piston head 108 on the stem 150. The details of this cylinder and the piston are identical with the cylinder and piston and cooperating parts disclosed in Fig. 2 and described in connection therewith.

From the base of the back plate 124 and substantially centrally of the length thereof, there extends a curved bracket 191 formed with an upwardly projecting ear 192 in which is mounted a pivot pin 193, the finder 6 being pivoted on said pin 193. The bracket 191 is formed with an elongated slot 194 through which extends the lug 182 formed on the collar 181, and a screw 195 passes through an elongated slot 196 in the lower end of said finder 6 and enters a suitable tapped hole in said lug 182. It will be understood that this arrangement provides for the movement of the free end of the finder 6 over the dial 5 in correspondence to shifting of the collar 181 along the shaft 173.

A lug 197 extends inwardly from a wall of the housing 122, and a bolt 198 secures thereto one end of a latch member 199, the other end of said member being adapted to be secured to said back plate 124 by means of a second bolt 200. The periphery of the flange 186 of the collar 185 is formed with one or more notches 201 into any one of which the edge of the latch member 199 is adapted to enter when in the position shown in full lines in Fig. 5, whereby said collar is prevented from rotation. The bolt 200 may be removed to permit the corresponding end of the latch member 199 to drop down into the position shown in dotted outline in Fig. 5 to permit adjustment of said collar 185 independently of the collar 181.

The housing 122 is provided with an aperture closed by a transparent plate 202, said aperture registering with the dial plate 5.

As will be readily understood, the operation of the device herein described absorbs a certain amount of the pressure available in the reservoir 8. The pressure in such reservoirs often fall to a low value, such as 90 or 95 pounds. The tires of trucks run under a relatively heavy pressure, such as 75 to 85 pounds, and it has been found that such a pressure might not be obtainable through the use of the present device if the pressure in the reservoir were only 90 or 95 pounds.

In order to make it possible to deliver such pressure to a heavy tire, I provide a sleeve 203 press-fitted onto the flange 204 of the nut 181 and extending a considerable distance toward the closure member 171 of the casing 170. This sleeve is so dimensioned that, in case conditions as above outlined should arise, the driver may turn the handle 81 sufficiently to move the nut 181 substantially to its extreme position toward the left hand end of the shaft 173, as viewed in Fig. 5, to bring the end 205 of the sleeve 203 into engagement with the closure member 171. Thus, the casing 170 is rigidly held against valve closing movement toward the right as viewed in Fig. 5, and the entire pressure which is available in the reservoir 8 may be communicated to the tire without loss of pressure in the operation of the device.

The operation of the modification disclosed in Figs. 4 to 7 is quite similar to that of the modification disclosed in Figs. 1 to 3, but the former mechanism has certain advantages over the latter. When the mechanism is first installed, and the inlet pipe 7 is connected to the pressure reservoir 8, air flows from said reservoir through the pipe 7 and connection 128 to the valve chamber 127. As has been stated, the force of the spring 138 may be varied by adjustment of the nut 137 to vary the pressure required to move the valve 133 off its seat on the end of the projection 132, it being understood that the spring 138 tends to seat said valve. Thus the pressure in the reservoir 8, pipe 7, and chamber 127 must attain a predetermined minimum value before the valve 133 will open to permit any fluid to flow into the major portion of the apparatus.

When the pressure attains said minimum value, the valve 133 is forced off its seat, and air flows through the bore of the projection 132, the connection 139, and the pipe 140 to the interior of the valve casing 142. Presuming the parts to be in the position indicated in Fig. 5, the air will flow thence through the bore 145, connection 48, pipe 49, connecting member 162, port 161, aperture 163, and passage 164 to the chamber 159. The valve 10 being closed, pressure will build up in the chamber 159 until it attains a value sufficient to act upon the diaphragm 160 to compress the spring 184. As is obvious from an inspection of Fig. 5, a certain amount of movement of the casing 170 toward the right as viewed in said figure, may take place before the end 179 of the casing 170 contacts with the flange 189 on the seat member 188.

This initial movement of the casing 170 toward the right brings the plug 112 of the cylinder 106 into engagement with the adjacent end of the spring 111 and begins to compress said spring, and further brings the cam face 120 of the cam member 118 just into engagement with the pin 60 on the latch member 56. Further movement of the casing 170 toward the right is resisted by both springs 184 and 187, and such movement causes said pin 60 to ride upwardly along the cam face 120 to release the engagement of said latch member with the shoulder 153 on the stop member 152. The spring 111 is thus enabled to snap the valve 149 to closed position against the valve seat 146 on the projection 144. This places the apparatus in condition for use.

When a motorist approaches the device to inflate his tires, he operates the handle 81 to rotate the shaft 173 in one direction or the other to bring the end of the finder 6 opposite the desired numeral on the dial 5, it being understood that such movement of the finder 6 is effected by the longitudinal shifting of the collar 181, which results in corresponding shifting of the lug 182. Such rotation of the shaft 173 causes the collars 181 and 185 to move in opposite directions; i. e., if the collar 181 moves to compress the spring 184, the collar 185 moves to release the compression of the spring 187 by a corresponding amount. Thus it will be seen that, while the pressure required to move the casing 170 in a direction calculated to open the valve 149 may be varied by actuation of the handle 81, the pressure value at which the casing 170 will move to effect the closing of the valve 149 will not be varied by such actuation.

When the finder 6 has been properly set, the motorist applies the valve 10 to his tire valve 11, thus permitting the air in the chamber 159 to flow out through the pipe 123. This flow reduces the pressure in the chamber 159, since the valve 149 is closed, and the combined force of the springs 184 and 187 moves the casing 170 to the left as viewed in Fig. 5, thus compressing the spring 110 and bringing the cam face 121 just into engagement with the pin 59 on the latch member 56. Such movement of the casing 170 brings the seat member 188 into engagement with the bushing 178, thus relieving the casing 170 of the pressure of the spring 187. Further movement toward the left will not take place, then, until the pressure in the chamber 159 falls to a value such that the force of the spring 184 alone is sufficient to overcome it. This value, of course, is variable in accordance with the setting of the nut 181. When the pressure in the chamber 159 has fallen to the predetermined value, the spring 184 moves the casing 170 to its extreme left-hand position, thus causing the pin 59 to ride up along the cam face 121 to release the engagement of the latch 56 with the shoulder 155 to permit the valve 149 to open.

As has been explained, the valves 10 and 11 constrict the passage through which the air flows into the tire, and consequently the opening of the valve 149 permits air to flow into the chamber 159 at a greater rate than that at which it leaves said chamber and consequently a pressure is again built up in the chamber 159 to move the diaphragm 160 and the chamber 170 to the right to cause closure of the valve 149. This cycle is repeated until the pressure in the tire is so high as to maintain the pressure in the chamber 159 at a value too high to be overcome by the force of the spring 184.

In case it is desired to vary the pressure in the chamber 159 at which the casing 170 is moved to the right to close valve 144, the bolt 200 can be removed, the latch 199 swung to the position shown in dotted outline in Fig. 5, and the collar 185 adjusted independently of the collar 181.

There is a possibility that the pressure in the supply reservoir 8 might drop to a value such as to be insufficient to move the casing 170 to the right to close the valve 149, and yet to be too high to be communicated directly to the tire. If such a situation should arise, the tire would be inflated beyond the desirable limit and a blow-out might result. It is for this reason that I have provided the valve 125 and its cooperating parts. The nut 137 is so set as to compress the spring 138 sufficiently to prevent the opening of the valve 133 when the pressure in the reservoir 8 falls below the predetermined value sufficient to move the diaphragm 160 to cause closure of the valve 149.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. An air metering device for supplying compressed air to a container in pulsations of heavy pressure without danger of oversupply comprising a pressure source, a line adapted to connect said source with a container, a valve in said line, and mechanism responsive to pressure in said line beyond said valve for opening and closing said valve to effect pulsating delivery through said line, said mechanism comprising a flexible diaphragm having one face exposed to the pressure in said line, an element movable in one direction by said diaphragm, a spring urging said element in the opposite direction, a second spring supplementing the action of said first-named spring after initial movement of the first spring and means operable by the user of said device for varying the compression of said first-named spring.

2. An air metering device for supplying compressed air to a container in pulsations of heavy pressure without danger of oversupply comprising a pressure source, a line adapted to connect said source with a container, a valve in said line, and mechanism responsive to pressure in said line beyond said valve for opening and closing said valve to effect pulsating delivery through said line, said mechanism comprising a flexible diaphragm having one face exposed to the pressure in said line, an element movable in one direction by said diaphragm, a spring urging said element in the opposite direction, a second spring having its one end engaging a slidable abutment, said abutment being disposed in the path of said element but being normally out of contact therewith, and means operable by the user of said device for varying differentially the compression of both of said springs.

3. An air metering device for supplying compressed air to a container in pulsations of heavy pressure without danger of oversupply comprising a pressure source, a line adapted to connect said source with a container, a valve in said line, and mechanism responsive to pressure in said line beyond said valve for opening and closing said valve to effect pulsating delivery through said line, said mechanism comprising a flexible diaphragm having one face exposed to the pressure in said line, an element movable in one direction by said diaphragm, a spring urging said element in the opposite direction, a second spring having its one end engaging a slidable abutment, said abutment being disposed in the path of said element but being normally out of contact therewith, means operable by the user of said device for varying differentially the compression of both of said springs, and means operable only by an authorized person for varying the compression of said second spring independently.

4. In an air metering device, the combination with a source of air under pressure and a reservoir connected thereto, of a valve interposed between said source and said reservoir, a flexible diaphragm in said reservoir, a casing connected to said diaphragm, a spring coaxially with said casing and tending to move the same in one direction, and means externally of said casing for causing said valve to be opened upon movement of said casing in said one direction, and for causing said valve to be closed upon movement of said casing in the opposite direction.

5. In an air metering device, the combination with a source of air under pressure and a reservoir connected thereto, of a valve interposed between said source and said reservoir, a flexible diaphragm in said reservoir, a casing connected to said diaphragm, a compression spring in said casing and having its one end abutting against the closed end of said casing and its other end abutting against a fixed stop and tending to move said casing in one direction, and means externally of said casing for causing said valve to be opened upon movement of said casing in said one direction, and for causing said valve to be closed upon movement of said casing in the opposite direction.

6. In an air metering device, a pressure feed line, a reservoir, a valve between said feed line and said reservoir, and means actuated by the pressure in said reservoir for operating said valve, whereby relatively high pressures cause said valve to be closed while relatively low pressures cause said valve to be opened, said means including a differential spring means adjustable to vary the pressure value necessary to open said valve, and latch means for causing a lag and subsequent quick action in the operation of said valve.

7. In an air metering device, a pressure feed line, a reservoir, a valve between said feed line and said reservoir, and means actuated by the pressure in said reservoir for operating said valve, whereby relatively high pressures cause said valve to be closed while relatively low pressures cause said valve to be opened, said means including a differential spring means adjustable to vary the pressure value necessary to open said valve without varying the pressure value necessary to close said valve, and latch means for causing a lag and subsequent quick action in the operation of said valve.

8. In an air metering device, a pressure feed line, a reservoir, a valve between said feed line and said reservoir, means actuated by the pressure in said reservoir for operating said valve, whereby relatively high pressures cause said valve to be closed while relatively low pressures cause said valve to be opened, said means including a differential spring means adjustable to vary the pressure value necessary to open said valve without varying the pressure value necessary to close said valve, means to adjust said last-named means, and a member carried by said adjusting means to prevent closure of said valve.

9. In an air metering device, a pressure feed line, a reservoir, a valve between said feed line and said reservoir, and means responsive to pressures in said reservoir for operating said valve, said means including a pair of springs adapted to urge said means toward valve-opening position, and said springs being so arranged that only one effects ultimate valve-opening movement of said means while both oppose ultimate valve-closing movement of said means, and means to adjust the compression of said springs differentially.

10. In an air metering device, a housing enclosing a pressure feed line, a reservoir, a valve between said feed line and said reservoir, a flexible diaphragm in said reservoir, a rod connected to said diaphragm, a shaft journalled in said housing in substantial alinement with said rod, a tubular casing having a closed end and an open end slidably receiving said shaft, said rod abutting against the closed end of said casing, said shaft being formed with differential threads adjacent its opposite ends, a collar threaded on said shaft within said casing, a coiled spring having its one end abutting said collar and its opposite end abutting the closed end of said casing, a second collar threaded on the opposite end of said shaft, a second coiled spring having its one end abutting said second collar and its opposite end abutting a slidable seat, said seat being disposed in the path of said casing but slightly spaced therefrom, means for preventing rotation of said collars, and means carried by said casing for causing actuation of said valve.

11. In an air metering device, a housing enclosing a pressure feed line, a reservoir, a valve between said feed line and said reservoir, a rod connected to said diaphragm, a shaft journalled in said housing in substantial alinement with said rod, a tubular casing having a closed end and an open end slidably receiving said shaft, said rod abutting against the closed end of said casing, said shaft being formed with differential threads adjacent its opposite ends, a collar threaded on said shaft within said casing a coiled spring having its one end abutting said collar and its opposite end abutting the closed end of said casing, a second collar threaded on the opposite end of said shaft, a second coiled spring having its one end abutting said second collar and its opposite end abutting a slidable seat, said seat being disposed in the path of said casing but slightly spaced therefrom, means for preventing rotation of said collars, a graduated dial in said housing, a finder pivoted in said housing, means connecting said first collar and said finder whereby movement of said collar moves said finder over said dial, and means carried by said casing for causing actuation of said dial.

12. An air metering device for supplying compressed air to a container in pulsation of heavy pressure, comprising a passage adapted to be connected between a source of fluid under pressure and a container, a valve in said passage, and mechanism responsive to pressure in said passage beyond said valve for opening and closing said valve to effect pulsating delivery through said passage, said mechanism including a latch mechanism comprising an oscillatable plate and spaced abutments on the stem of said valve, pins on said plate and cams adapted to engage said pins, said plate being adapted to positively hold said valve in closed position, a member adapted to be moved by said pressure-responsive means to bias said valve toward closed position, and a spring engaging said member and adapted to move the same against the tendency of said pressure-responsive means to release said latch.

13. An air metering device for supplying compressed air to a container in pulsations of heavy pressure, comprising a passage adapted to be connected between a source of fluid under pressure and a container, a valve in said passage, and mechanism responsive to pressure in said passage beyond said valve for opening and closing said valve to effect pulsating delivery through said passage, said mechanism including a latch mechanism comprising an oscillatable plate and spaced abutments on the stem of said valve, pins on said plate and cams adapted to engage said pins, said plate being adapted to positively hold said valve in closed position, a member adapted to be moved by said pressure-responsive means to bias said valve toward closed position, a spring engaging said member and adapted to move the same against the tendency of said pressure-responsive means to release said latch, and means adjustable by the user of the device for varying the compression of said spring.

14. Apparatus of the class described comprising in combination a snap valve, a pressure-responsive motor for opening and closing the valve, and means for controlling the opening and closing of the valve including a member secured to the motor, a pair of springs adapted to act in opposite directions on the member and means for confining the springs so that only one spring can act on the member at a time.

15. Apparatus of the class described comprising in combination a snap valve, a pressure-responsive motor for opening and closing the valve, and means for controlling the pressures at which the motor opens and closes the valve including a member secured to the motor, a pair of springs adapted to act in opposite directions on the member, means for confining the springs so that only one spring can act on the member at a time, and means for adjusting the tension of each spring independently of the other spring.

16. Apparatus of the class described comprising in combination a snap valve, a pressure-responsive motor for opening and closing the valve, and means for controlling the pressure at which the motor opens and closes the valve including a member secured to the motor, a pair of springs adapted to act in opposite directions on the member, means for confining the springs so that only one spring can act on the member at a time, and means for adjusting the tension of each spring without affecting the space relation between such spring and the member.

17. Apparatus of the class described comprising in combination a snap valve, a pressure-responsive motor for opening and closing the valve, and means for controlling the opening and closing of the valve including a member secured to the motor, a pair of springs adapted to act in opposite directions on the member and means for confining the springs so that only one spring can act on the member at a time, the member having a lost motion connection with each of the springs.

FREDERICK H. RAGAN.